(12) United States Patent
Nishida (10) Patent No.: US 6,343,583 B1
(45) Date of Patent: Feb. 5, 2002

(54) INTAKE MANIFOLD OF INTERNAL COMBUSTION ENGINE

(75) Inventor: Masaya Nishida, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/550,018

(22) Filed: Apr. 14, 2000

(30) Foreign Application Priority Data

Apr. 21, 1999 (JP) ............................................. 11-113448

(51) Int. Cl.[7] ............................................... F02M 35/10
(52) U.S. Cl. .................................. 123/184.38; 181/229
(58) Field of Search ....................... 123/184.21, 184.61, 123/184.53, 184.38, 568.17; 181/229

(56) References Cited

U.S. PATENT DOCUMENTS

| | | | | |
|---|---|---|---|---|
| 5,341,773 A | * | 8/1994 | Schulte et al. | 123/184.61 |
| 5,603,295 A | * | 2/1997 | Topfer et al. | 123/184.53 |
| 5,722,357 A | | 3/1998 | Choi | 123/184.21 |
| 6,173,701 B1 | * | 1/2001 | Azuma | 123/568.17 |

OTHER PUBLICATIONS

Hitoshi; "Synthetic Resin Intake Pipe and Manufacture Therefor"; Patent Abstracts of Japan; Publication No. 10–281025; Publication Date: Oct. 20, 1998; Abstract.
Masanori et al.; "Intake Device for Internal Combustion Engine", Patent Abstracts of Japan; Publication No. 09–317579; Publication Date: Dec. 9, 1997; Abstract.
Takayuki; "Exhaust Gas Recirculation Device for Intake manifold Made of Resin"; Patent Abstracts of Japan; Publication No. 09–068118; Publication Date: Mar. 11, 1997.

* cited by examiner

Primary Examiner—Henry C. Yuen
Assistant Examiner—Hyder Ali
(74) Attorney, Agent, or Firm—Foley & Lardner (57) ABSTRACT

An intake manifold including a collector defining an intake bore through which an air flow passes, and a noise reducer connected with the collector. The noise reducer includes a base wall mounted to the collector and formed with an aperture substantially aligned with the intake bore, and a cover wall extending over at least a portion of a circumferential inner surface of the wall to reduce noise generated within the intake bore.

30 Claims, 5 Drawing Sheets

INTAKE MANIFOLD OF INTERNAL COMBUSTION ENGINE

BACKGROUND OF THE INVENTION

This invention relates to an intake manifold of an internal combustion engine.

Internal combustion engines generally include intake manifolds adapted for distributing intake air introduced thereinto through a throttle valve within a throttle body, into engine cylinders. The intake manifolds have a hole for introducing canister purge gas, a hole for picking up intake manifold vacuum and a mounting hole for mounting an exhaust gas recirculation (EGR) pipe that feeds a part of exhaust gas discharged from the engine to the intake manifolds. In addition, there are known intake manifolds made of a resin material for the purpose of reduction of weight of vehicles. Japanese Patent Application First Publications Nos. 10-281025, 9-317579 and 9-68118 disclose such the intake manifolds.

It is generally known that a turbulent flow of the intake air flowing into the intake manifold is caused as the throttle valve opens and closes. The turbulent flow generates noise within the intake manifold, which is radiated from the intake manifold to surroundings.

SUMMARY OF THE INVENTION

In the Japanese Patent Application First Publication No. 10-281025, there is described a sound insulating wall provided on a curved outer peripheral surface of the intake manifold. However, the arrangement will undesirably limit an installation space around the intake manifold.

Further, in the intake manifold having the above-described holes positioned immediately downstream of the throttle body, a so-called whistling noise is occasionally caused upon the intake air flowing from the throttle body into the intake manifold.

Meanwhile, in the case of the intake manifold made of a resin material, it will be undesirably expected that high temperature of the exhaust gas recirculated to the intake manifold causes problems such as, for instance, thermal deformation, strength deterioration and the like.

In the Japanese Patent Application First Publication No. 9-68118, the EGR pipe includes a double-walled end portion projecting into the intake manifold. The end portion includes inner and outer pipes and radiating panels disposed on an outer surface of the outer pipe. However, the arrangement of the conventional technique is complicated and low in cost performance.

In the Japanese Patent Application First Publication No. 9-317579, the EGR pipe includes a main pipe and branch pipes diverged from the main pipe. Each branch pipe has an end portion curved toward the downstream side of the intake air flow in order to prevent the high temperature exhaust gas flowing therein from directly blowing onto an inner surface of the intake manifold. A mounting hole for the curved branch pipe is formed in a tapered recessed wall portion of the intake manifold. The tapered recess has a relatively large size in order to easily mount the curved end portion of the branch pipe to the intake manifold. When the air flows into the intake manifold, turbulence will be generated in the air in the intake manifold due to the tapered recess. This will cause noise and then noise radiated from the intake manifold.

It is an object of the present invention to provide an intake manifold and an air intake system for an internal combustion engine that are capable of eliminating the above-described disadvantages of the conventional techniques.

According to one aspect of the present invention, there is provided an intake manifold for allowing an air flow into an internal combustion engine, comprising:

a wall defining an intake bore through which the air flow passes, said wall including a mounting portion; and a noise reducer reducing noise generated within the intake bore, said noise reducer including a base wall, which defines an aperture substantially aligned with the intake bore of the wall and has a mounting surface connected with the mounting portion of the wall, and a cover wall extending from the mounting surface into the intake bore toward the downstream side of the air flow and covering at least a portion of a circumferential inner surface of the wall.

According to a further aspect of the present invention, there is provided an air intake system for controlling a flow of air into an internal combustion engine, comprising:

a throttle body including a first wall defining a throttle bore into which the air flows and a throttle valve moveably disposed within the throttle bore, said first wall including a first mounting portion;

an intake manifold including a second wall defining an intake bore, said second wall including a second mounting portion; and a noise reducer reducing noise generated within the intake bore upon the throttle valve moving, said noise reducer including a base wall that defines an aperture substantially aligned with the throttle bore of the throttle body and the intake bore of the intake manifold and includes a first mounting surface connected with the first mounting portion of the throttle body and a second mounting surface connected with the second mounting portion of the intake manifold, said noise reducer including a cover wall extending from the second mounting surface into the intake bore toward the downstream side of the air flow and covering at least a portion of a circumferential inner surface of the second wall.

According to a still further aspect of the present invention, there is provided An intake manifold for allowing air to flow into an internal combustion engine, comprising:

first wall means for defining an intake bore in which the air flows; and second wall means for reducing noise generated within a portion of the intake bore, said second wall means covering at least a portion of a circumferential inner surface of the first wall means which surrounds the portion of the intake bore.

DETAILED DESCRIPTION OF THE INVENTION

Referring to the drawings, an intake manifold incorporated into an air intake system of an internal combustion engine, according to the present invention, will be explained hereinafter. In this embodiment, the air intake system is used in the internal combustion engine of a six-cylinder type.

Figure 1:
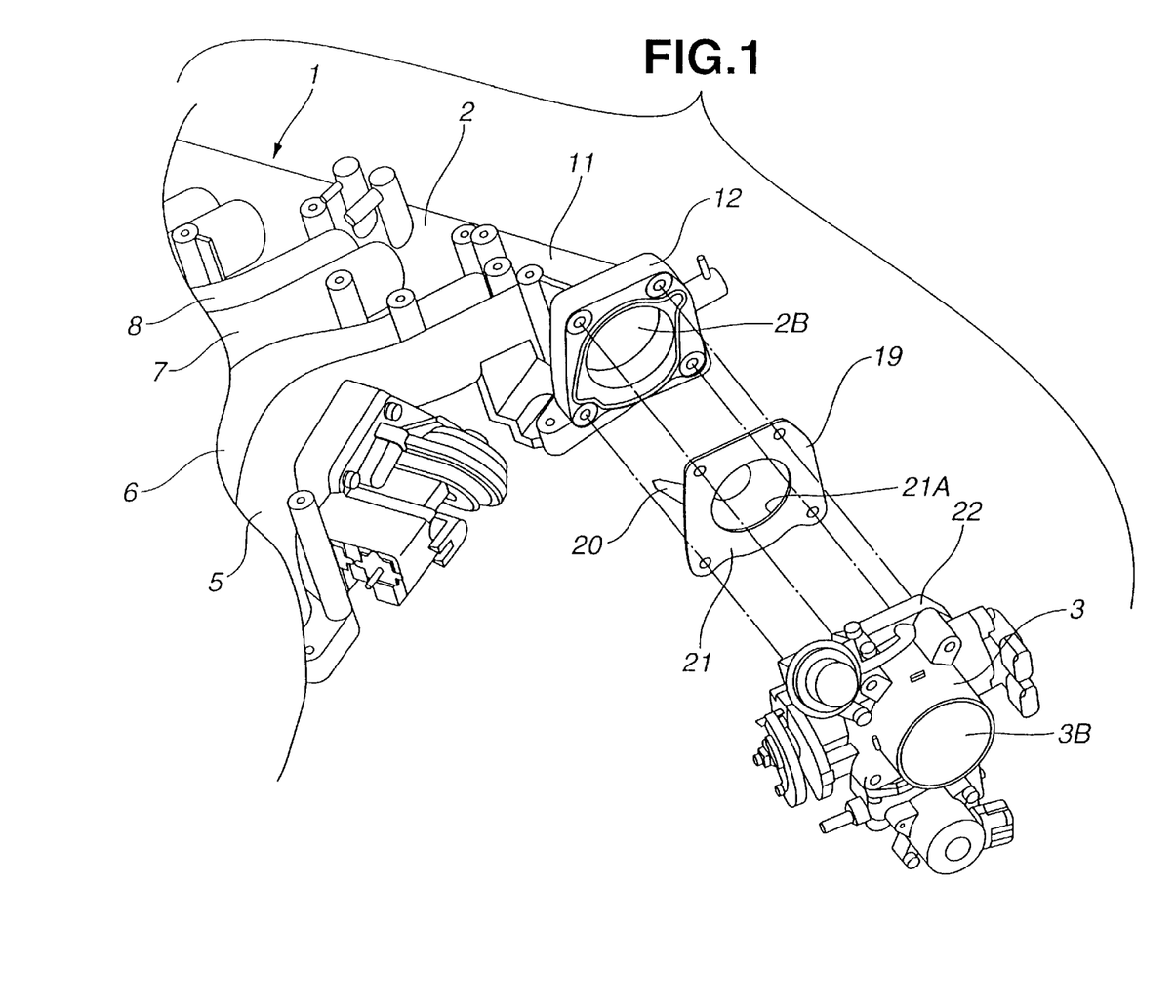
FIG. 1 is an exploded perspective view of an air intake system including an intake manifold with a noise reducer, according to the present invention.
Figure 2:
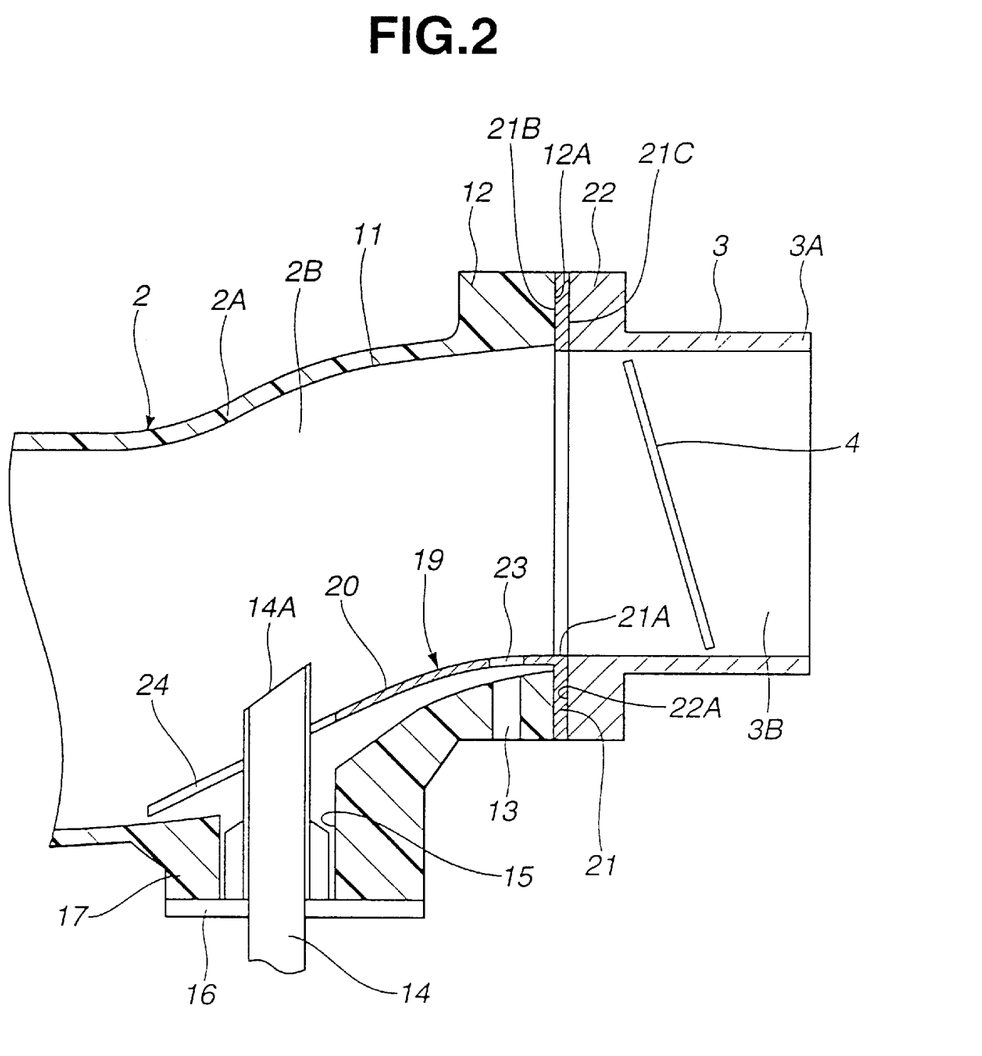
FIG. 2 is a partial section of the air intake system, taken along the flow of intake air passing through the intake system.
Figure 3:
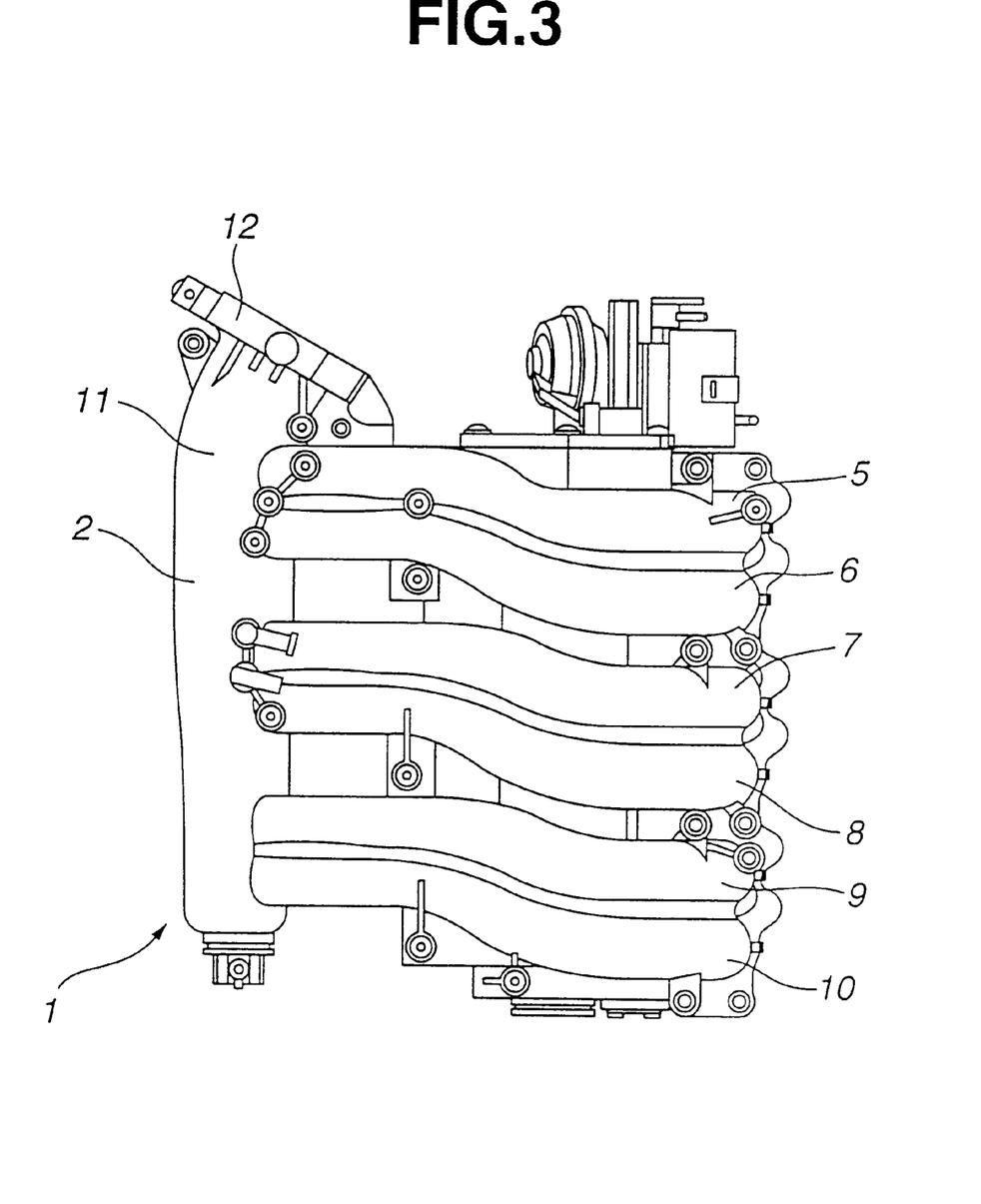
FIG. 3 is a schematic plan view of the intake manifold.

As illustrated in FIGS. 1 and 2, the air intake system of the internal combustion engine includes an intake manifold 1 and a throttle body 3 connected with the intake manifold 1. A throttle valve 4 is installed in the throttle body 3. The intake manifold 1 includes a collector 2 and six branches 5–10 connected with the collector 2 as shown in FIG. 3. At least the collector 2 may be made of a resin material. The overall intake manifold 1 is made of a resin material in this embodiment, but the intake manifold 1 can be modified such that only the collector 2 is made of a resin material. The throttle valve 4 is made of a sheet metal of iron and the throttle body 3 is made of aluminum. Each of the throttle body 3 and the throttle valve 4 may be made of a resin material.

As illustrated in FIG. 3, the collector 2 of the intake manifold 1 has a generally cylindrical shape elongated in an axial direction of the engine. The collector 2 includes an inlet portion 11 gently curved inwardly and upwardly relative to the engine, as shown in FIGS. 2 and 3. The collector 2 has a wall 2A defining a generally cylindrical intake bore 2B into which air flows from the throttle body 3. The intake bore 2B includes an inlet bore portion inside the inlet portion 11. The intake bore 2B acts as an air passage for the air flowing from the throttle body 3 into the collector 2.

Referring back to FIG. 2, the wall 2A of the collector 2 includes a mounting portion 12 positioned at an upstream end of the inlet portion 11. The mounting portion 12 is connected to a mounting portion 22 of a wall 3A of the throttle body 3. Specifically, the mounting portion 12 is in the form of a radial flange extending radially outwardly from the upstream end of the inlet portion 11 of the collector 2. The mounting portion 12 has a mounting surface 12A at the upstream end thereof. On the other hand, the mounting portion 22 of the throttle body 3 is positioned at a downstream end of the throttle body 3 and in the form of a radial flange extending radially outwardly from the downstream end. The mounting portion 22 has a mounting surface 22A at the downstream end thereof.

The wall 3A of the throttle body 3 defines a generally cylindrical throttle bore 3B. The throttle bore 3B is substantially in alignment with the intake bore 2B. The throttle valve 4 is disposed within the throttle bore 3B and moveable between open and closed positions thereof.

As illustrated in FIG. 2, the wall 2A of the collector 2 has a purge gas hole 13 for introducing a canister purge gas. The purge gas hole 13 is connected with a canister purge passage, not shown. The purge gas hole 13 extends radially inwardly through the mounting portion 12 to be open to the circumferential inner surface of the wall 2A of the inlet portion 11. The mounting portion 12 of the wall 2A is also formed with a vacuum pickup hole, not shown, for picking up intake manifold vacuum. Further, the wall 2A has a mounting hole 15 for mounting an exhaust gas recirculation (EGR) pipe 14 that feeds a part of an exhaust gas discharged from the engine cylinder to the intake manifold 1. The mounting hole 15 is formed in a mounting boss 17 that is disposed near and downstream of the mounting portion 12. The EGR pipe 14 has an outlet end 14A projecting through the mounting hole 15 into the inlet bore portion of the intake bore 2B. The EGR pipe 14 has a collar 16 fixed to the mounting boss 17 through an O-ring seal, not shown. The EGR pipe 14 is thus mounted to the collector 2. The mounting hole 15 penetrates the mounting boss 17 to be open to the circumferential inner surface of the wall 2A of the inlet portion 11. The circumferential inner surface of the wall 2A of the inlet portion 11 where the purge gas hole 13 and the mounting hole 15 are disposed, is radially outwardly recessed as shown in FIG. 2.

Figure 4:
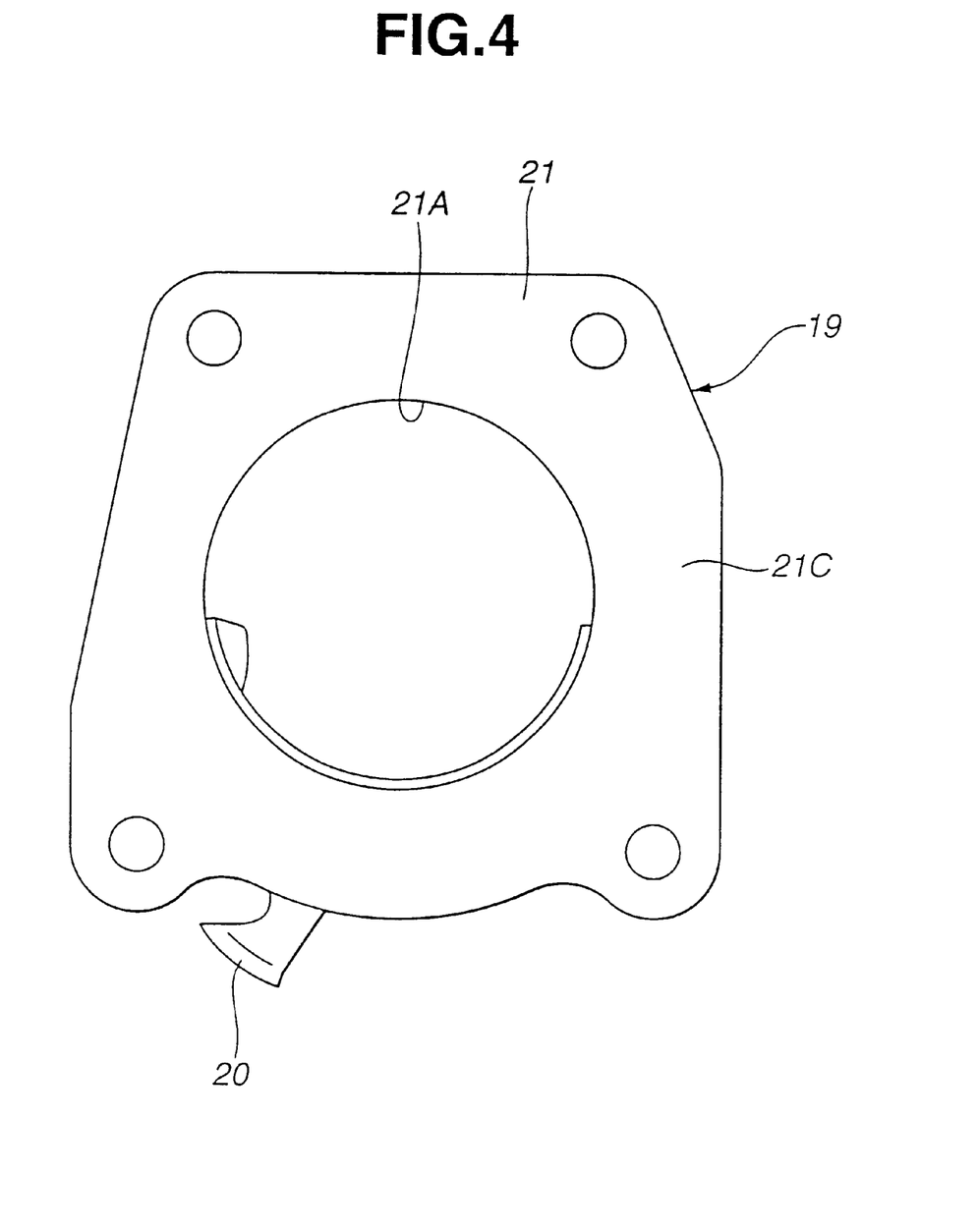
FIG. 4 is an enlarged front elevation of the noise reducer as viewed from the upstream side of an air flow.
Figure 5:
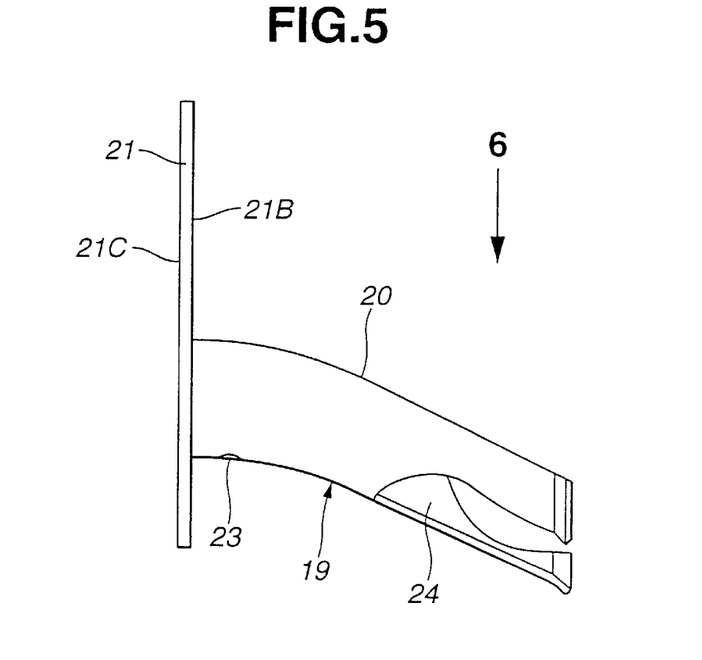
FIG. 5 is a side view of the noise reducer as viewed from a direction indicated by arrow 5 shown in FIG. 6.
Figure 6:
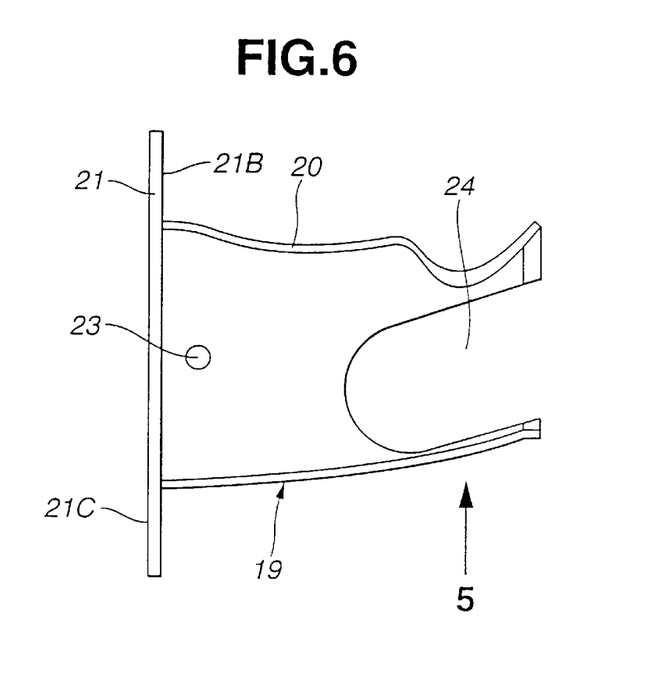
FIG. 6 is a top plan view of the noise reducer as viewed from a direction indicated by arrow 6 shown in FIG. 5.

Disposed between the throttle body 3 and the collector 2 of the intake manifold 1 is a noise reducer 19 reducing noise generated within the intake bore 2B. The noise reducer 19 is in the form of a generally tubular shape. The noise reducer 19 includes a base wall 21 connected with the mounting portions 12 and 22 of the collector 2 and the throttle body 3, and a cover wall 20 covering at least a portion of the circumferential inner surface of the wall 2A of the inlet portion 11 of the collector 2. Specifically, the base wall 21 defines an aperture 21A substantially aligned with the intake bore 2B and the throttle bore 3B. The base wall 21 is interposed between the mounting portions 12 and 22 and fixed thereto by tightening bolts, not shown. The base wall 21 has a generally rectangular shape as shown in FIG. 4. The base wall 21 has a mounting surface 21B contacted with the mounting surface 12A of the mounting portion 12 and an opposite mounting surface 21C contacted with the mounting surface 22A of the mounting portion 22 of the wall 3A of the throttle body 3. The cover wall 20 extends from the mounting surface 21B into the inlet bore portion of the intake bore 2B toward the downstream side of the air flow so as to cover the radially outwardly recessed circumferential inner surface of the wall 2A of the inlet portion 11 to which the holes 13 and 15 are open. The cover wall 20 is formed into a part of such a streamline shape as to rectify the air flow passing through the inlet bore portion of the intake bore 2B. Specifically, the cover wall 20 has a semitubular shape with openings 23 and 24 as shown in FIGS. 5 and 6. The openings 23 and 24 are formed corresponding to the holes 13 and 15 in substantial alignment with the holes 13 and 15, respectively. The cover wall 20 may be shaped of a tubular shape covering substantially the entire circumferential inner surface of the wall 2A of the inlet portion 11 except the holes 13 and 15. The cover wall 20 is radially spaced from the recessed circumferential inner surface of the wall 2A of the inlet portion 11. Thus, there are generated radial clearances between the openings 23 and 24 in the cover wall 20 and the holes 13 and 15 in the wall 2A. The opening 24 is a cutout in this embodiment but it may be a hole. The outlet end 14A of the EGR pipe 14 projecting through the opening 24 into the inlet bore portion of the intake bore 2B is so arranged as not to reach a center axis of the intake bore 2B. The outlet end 14A has a sloped edge inclined relative to a center axis of the EGR pipe 14 toward the downstream side of the air flow, as shown in FIG. 2. The noise reducer 19 is made of metal in this embodiment, but it may be made of a resin material.

As be appreciated by the above-explanation, the noise reducer 19 can reduce the noise which is caused due to the turbulence generated in the air within the inlet portion 11 of the collector 2 as the throttle valve 4 opens and closes and then radiated from the intake manifold 1. The noise reducer 19 can be easily mounted to the intake manifold 1 by tightening the bolts through the base wall 21 and the mounting portions 12 and 22 of the intake manifold 1 and the throttle body 3, between which the base wall 21 is interposed. Thus, the noise reducer 19 is much readily mounted to the intake manifold 1 as compared with the sound insulator used in the above-explained conventional technique which is mounted to the outer surface of the intake manifold. Further, the noise reducer 19 can increase freedom of the layout of surroundings around the intake manifold 1 and can also have a less influence on the appearance of the intake manifold 1.

Further, the noise reducer 19 can reduce the whistling noise created at the purge gas hole 13. Specifically, the opening 23 in the cover wall 20 is positioned in the radially spaced relation to the purge gas hole 13. In addition, since the cover wall 20 has a small thickness, the opening 23 has a short depth extending in substantially the radial direction of the inlet bore portion of the intake bore 2B. This can prevent resonance in the air in the hole 13, reducing the whistling noise caused by the resonance. The opening 23 also permits the purge gas flowing from the hole 13 into the intake bore 2B to be diffused and directed therethrough toward the radial-center of the inlet bore portion of the intake bore 2B.

Furthermore, the cover wall 20 of the noise reducer 19 extends over the recessed circumferential inner surface of the wall 2A of the inlet portion 11 to which the mounting holes 13 and 15 are open, so that turbulence in the air within the inlet portion 11 can be prevented from increasing. The increasing turbulence will be caused because a cross-sectional area of the inlet bore portion becomes abruptly greater at recessed circumferential inner surface. Further, with the arrangement of the cover wall 20, the air flow in the inlet bore portion of the intake bore 2B can be rectified and allowed to smoothly pass through the inlet portion 11 of the collector 2. As a result, the noise created by the turbulence in the air within the inlet portion 11 can be reduced and the noise radiated through the wall 2A of the collector 2 can be reduced. In addition, the cover wall 20 can prevent the exhaust gas having a high temperature from directly blowing from the outlet end 14A of the EGR pipe 14 onto the recessed circumferential inner surface of the wall 2A near the mounting hole 15. The collector 2 can be thus prevented from being thermally deformed and deteriorated in strength due to the heat of the exhaust gas blowing from the EGR pipe 14.

The effects described above can also be exhibited in the case of the intake manifold made of alloy, for instance, aluminum alloy.

This application is based on Japanese Patent Application No. 11-113448, filed on Apr. 21, 1999, the entire contents of which, inclusive of the specification, claims and drawings, are hereby incorporated by reference herein.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. An intake manifold for allowing an air flow into an internal combustion engine, comprising:
   a wall defining an intake bore through which the air flow passes, said wall including a mounting portion; and
   a noise reducer reducing noise generated within the intake bore, said noise reducer including a base wall, which defines an aperture substantially aligned with the intake bore of the wall and has a mounting surface connected with the mounting portion of the wall, and a cover wall extending from the mounting surface into the intake bore toward the downstream side of the air flow and covering at least a portion of a circumferential inner surface of the wall,
   the wall being formed with a hole open into the at least a portion of the circumferential inner surface, said cover wall of the noise reducer being formed with an opening positioned corresponding to the hole.

2. An intake manifold as claimed in claim 1, wherein the hole includes a purge gas hole adapted for introducing a canister purge gas into the intake bore.

3. An intake manifold as claimed in claim 1, wherein the hole includes a vacuum pickup hole for picking up intake manifold vacuum.

4. An intake manifold as claimed in claim 1, wherein the hole includes a mounting hole for mounting an exhaust gas recirculation (EGR) pipe feeding a part of an exhaust gas discharged from the engine to the intake manifold, said opening including an opening arranged to permit an outlet end of the EGR pipe to project therethrough into the intake bore.

5. An intake manifold as claimed in claim 4, wherein the cover wall of the noise reducer is so arranged as to prevent a direct blow of the exhaust gas onto the at least a portion of the circumferential inner surface of the wall near the mounting hole.

6. An intake manifold as claimed in claim 1, wherein the cover wall of the noise reducer is spaced from the circumferential inner surface of the wall.

7. An intake manifold for allowing an air flow into an internal combustion engine, comprising:
   a wall defining an intake bore through which the air flow passes, said wall including a mounting portion; and
   a noise reducer reducing noise generated within the intake bore, said noise reducer including a base wall, which defines an aperture substantially aligned with the intake bore of the wall and has a mounting surface connected with the mounting portion of the wall, and a cover wall extending from the mounting surface into the intake bore toward the downstream side of the air flow and covering at least a portion of a circumferential inner surface of the wall,
   the noise reducer being made of metal.

8. An air intake system for controlling a flow of air into an internal combustion engine, comprising:
   a throttle body including a first wall defining a throttle bore into which the air flows and a throttle valve moveably disposed within the throttle bore, said first wall including a first mounting portion;
   an intake manifold including a second wall defining an intake bore, said second wall including a second mounting portion; and
   a noise reducer reducing noise generated within the intake bore upon the throttle valve moving, said noise reducer including a base wall that defines an aperture substantially aligned with the throttle bore of the throttle body and the intake bore of the intake manifold and includes a first mounting surface connected with the first mounting portion of the throttle body and a second mounting surface connected with the second mounting portion of the intake manifold, said noise reducer including a cover wall extending from the second mounting surface into the intake bore toward the downstream side of the air flow and covering at least a portion of a circumferential inner surface of the second wall, the second wall of the intake manifold being formed with a hole open into the at least the portion of a circumferential inner surface of the second wall, said cover wall of the noise reducer being formed with an opening positioned corresponding to the hole.

9. An air intake system as claimed in claim 8, wherein the hole includes a purge gas hole for introducing a canister purge gas into the intake bore.

10. An air intake system as claimed in claim 8, wherein the hole includes a vacuum pickup hole for picking up intake manifold vacuum.

11. An air intake system as claimed in claim 8, wherein the hole includes a mounting hole for mounting an exhaust gas recirculation (EGR) pipe feeding a part of an exhaust gas discharged from the engine to the intake manifold, said opening including an opening arranged to permit an outlet end of the EGR pipe to project therethrough into the intake bore.

12. An intake manifold as claimed in claim 11, wherein the cover wall of the noise reducer is so arranged as to prevent a direct blow of the exhaust gas onto the at least a portion of the circumferential inner surface of the wall near the mounting hole.

13. An air intake system as claimed in claim 8, wherein the cover wall of the noise reducer is spaced from the at least a portion of the circumferential inner surface of the second wall.

14. An air intake system for controlling a flow of air into an internal combustion engine, comprising:
    a throttle body including a first wall defining a throttle bore into which the air flows and a throttle valve moveably disposed within the throttle bore, said first wall including a first mounting portion;
    an intake manifold including a second wall defining an intake bore, said second wall including a second mounting portion; and
    a noise reducer reducing noise generated within the intake bore upon the throttle valve moving, said noise reducer including a base wall that defines an aperture substantially aligned with the throttle bore of the throttle body and the intake bore of the intake manifold and includes a first mounting surface connected with the first mounting portion of the throttle body and a second mounting surface connected with the second mounting portion of the intake manifold, said noise reducer including a cover wall extending from the second mounting surface into the intake bore toward the downstream side of the air flow and covering at least a portion of a circumferential inner surface of the second wall,
    the noise reducer being made of metal.

15. An intake manifold for allowing air to flow into an internal combustion engine, comprising:
    first wall means for defining an intake bore in which the air flows; and
    second wall means for reducing noise generated within a portion of the intake bore, said second wall means covering at least a portion of a circumferential inner surface of the first wall means which surrounds the portion of the intake bore,
    the first wall means being formed with a hole open into the at least a portion of the circumferential inner surface, said second wall means being formed with an opening positioned corresponding to the hole.

16. An intake manifold as claimed in claim 15, wherein the hole includes a purge gas hole for introducing a canister purge gas into the intake bore.

17. An intake manifold as claimed in claim 15, wherein the hole includes a vacuum pickup hole for picking up intake manifold vacuum.

18. An intake manifold as claimed in claim 15, wherein the hole includes a mounting hole for mounting an exhaust gas recirculation (EGR) pipe feeding a part of an exhaust gas discharged from the engine to the intake manifold, said opening including an opening arranged to permit an outlet end of the EGR pipe to project therethrough into the intake bore.

19. An intake manifold for allowing an air flow into an internal combustion engine, comprising:
    a wall defining an intake bore through which the air flow passes, said wall including a mounting portion and a radially outwardly recessed circumferential inner surface defining a portion of the intake bore; and
    a noise reducer reducing noise generated within the intake bore, said noise reducer including a base wall, which defines an aperture substantially aligned with the intake bore of the wall and has a mounting surface connected with the mounting portion of the wall, and a cover wall extending from the mounting surface into the intake bore toward the downstream side of the air flow and covering the radially outwardly recessed circumferential inner surface of the wall with a space.

20. An intake manifold as claimed in claim 19, wherein the cover wall of the noise reducer is formed into a part of such a streamline shape as to rectify the air flow in the intake bore.

21. An intake manifold as claimed in claim 19, wherein the wall is made of a resin material.

22. An intake manifold as claimed in claim 19, further comprising a second wall defining branch passages diverged from the intake bore, said branch passages being adapted for connection with engine cylinders, respectively.

23. An intake manifold as claimed in claim 22, wherein the second wall is integrally formed with the first wall.

24. An air intake system for controlling a flow of air into an internal combustion engine, comprising:
    a throttle body including a first wall defining a throttle bore into which the air flows and a throttle valve moveably disposed within the throttle bore, said first wall including a first mounting portion;
    an intake manifold including a second wall defining an intake bore, said second wall including a second mounting portion and a radially outwardly recessed circumferential inner surface defining a portion of the intake bore; and
    a noise reducer reducing noise generated within the intake bore upon the throttle valve moving, said noise reducer including a base wall that defines an aperture substantially aligned with the throttle bore of the throttle body and the intake bore of the intake manifold and includes a first mounting surface connected with the first mounting portion of the throttle body and a second mounting surface connected with the second mounting portion of the intake manifold, said noise reducer including a cover wall extending from the second mounting surface into the intake bore toward the downstream side of the air flow and covering the radially outwardly recessed circumferential inner surface of the wall with a space.

25. An air intake system as claimed in claim 24, wherein the cover wall of the noise reducer is formed into a part of such a streamline shape as to rectify the air flow in the intake bore.

26. An air intake system as claimed in claim 24, wherein the second wall of the intake manifold is made of a resin material.

27. An air intake system as claimed in claim 24, wherein the intake manifold includes a third wall defining branch passages diverged from the intake bore, said branch passages being adapted for connection with engine cylinders, respectively.

28. An air intake system as claimed in claim 27, wherein the third wall is integrally formed with the second wall.

29. An intake manifold for allowing air to flow into an internal combustion engine, comprising:

first wall means for defining an intake bore in which the air flows, the first wall means including a radially outwardly recessed circumferential inner surface defining a portion of the intake bore; and second wall means for reducing noise generated within the intake bore, said second wall means covering the radially outwardly recessed circumferential inner surface of the first wall means with a space.

30. An intake manifold as claimed in claim 29, wherein the second wall means is formed into a part of such a streamlike shape as to facilitate the air flow through the intake bore.

* * * * *